US012806818B2

(12) United States Patent
Ni

(10) Patent No.: US 12,806,818 B2
(45) Date of Patent: Nov. 24, 2026

(54) WOOD ADHESIVE SYSTEM WITH ISOCYANATES AND FUNCTIONALIZED OIL

(71) Applicant: LOUISIANA-PACIFIC CORPORATION, Nashville, TN (US)

(72) Inventor: Jianwen Ni, Franklin, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 593 days.

(21) Appl. No.: 18/212,668

(22) Filed: Jun. 21, 2023

(65) Prior Publication Data

US 2023/0405867 A1 Dec. 21, 2023

Related U.S. Application Data

(60) Provisional application No. 63/353,865, filed on Jun. 21, 2022.

(51) Int. Cl.
*B27N 3/00* (2006.01)
*B27N 3/04* (2006.01)

(52) U.S. Cl.
CPC ............... *B27N 3/002* (2013.01); *B27N 3/04* (2013.01)

(58) Field of Classification Search
CPC .......... B27N 3/002; B27N 3/04; B27N 7/005; B27N 1/02; B27N 3/02; C08G 18/36; C08G 18/6492; C08G 18/7664; C09J 175/04
See application file for complete search history.

(56) References Cited

U.S. PATENT DOCUMENTS

2004/0140055 A1* 7/2004 Chen ...................... C09J 175/06 524/13
2005/0242459 A1* 11/2005 Savino .................. B27N 3/083 264/109
2007/0019153 A1 1/2007 Perel et al.
2009/0081468 A1† 3/2009 Mortensen
2010/0168287 A1† 7/2010 Moriarty
2012/0296014 A1† 11/2012 Gan
(Continued)

FOREIGN PATENT DOCUMENTS

WO 2021009210 A1 1/2021

OTHER PUBLICATIONS

International Search Report and Written Opinion, PCT/US23/025903, Lousiana-Pacific Corp. (international filing date Jun. 21, 2023).

*Primary Examiner* — George R Koch
*Assistant Examiner* — Christopher C Caillouet
(74) *Attorney, Agent, or Firm* — Wayne Edward Ramage; Baker Donelson

(57) ABSTRACT

A method or process for a wood adhesive system comprising polymeric diphenylmethane diisocyanate (pMDI) in combination with a functionalized oil. The wood adhesive system may be used in the manufacturing of engineered wood products, such as oriented-strand board, which typically are produced by various primary, and sometimes secondary, pressing processes. This combination provides an adhesive with reduced usage of pMDI while maintaining adhesive performance. The functionalized oil may be a modified vegetable oil, including, but not limited to, a soy oil chemically modified to incorporate hydroxyl groups, or amine groups, to its molecular chains.

18 Claims, 3 Drawing Sheets

(56) References Cited

U.S. PATENT DOCUMENTS

| | | | |
|---|---|---|---|
| 2013/0131231 | A1 † | 5/2013 | Bouguettaya |
| 2017/0225355 | A1 † | 8/2017 | Kumar |
| 2019/0345338 | A1 † | 11/2019 | Clausi |
| 2021/0362367 | A1 | 11/2021 | Feng et al. |

* cited by examiner
† cited by third party

WOOD ADHESIVE SYSTEM WITH ISOCYANATES AND FUNCTIONALIZED OIL

This application claims priority to U.S. Provisional App. No. 63/353,865, filed Jun. 21, 2022, which is incorporated herein by specific reference for all purposes.

FIELD OF INVENTION

This invention relates to a wood adhesive system comprising polymeric diphenylmethane diisocyanate (pMDI), and a functionalized oil.

BACKGROUND OF THE INVENTION

Building wall and roof assemblies are typically layers of several materials, each performing one or more specific functions, that typically are installed separately on the site in which the building is being constructed. Proper installation of the various layers individually and in combination creates challenges not only for the designer, but also for the installers.

A typical layer in most such assembles is a wood panel product, or an integral composite engineered panel product, including, but not limited to, engineered wood composite products. Wood-based composites have been found to be acceptable alternatives in most cases to dimension lumber or veneer-based wood paneling (e.g., softwood plywood). In general, wood-based composites include particle board, oriented strand board (OSB), wafer board, as well as medium density fiberboard (MDF), with the wood-based composites typically formed from a wood material combined with a thermosetting adhesive to bind the wood substrate together (the adhesive also may be referred to as a "binder"). Often times, the adhesive is combined with other additives to impart additional properties to the wood composites. Additives can include fire retardants, insecticides, water repellants, and preservatives. A significant advantage of wood-based composites is that they have many of the properties of plywood, but can be made from lower grade wood species and waste from other wood product production, and can be formed into panels in lengths and widths independent of size of the harvested timber.

A major reason for increased presence in the marketplace of the above-described product alternatives to dimension lumber or plywood is that these materials exhibit properties like those of the equivalent dimension lumber or plywood, especially, the properties of retaining strength, durability, stability and finish under exposure to expected environmental and use conditions. A class of alternative products are multilayer oriented wood strand boards, particularly those with a layer-to-layer oriented strand pattern, such as OSB. Oriented, multilayer wood strand boards are composed of several layers of thin wood strands, which are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type, and examples of processes for pressing and production thereof, are described in detail in U.S. Pat. Nos. 3,164,511, 4,364, 984, 5,425,976, 5,470,631, 5,525,394, 5,718,786, and 6,461,743, all of which are incorporated herein in their entireties by specific reference for all purposes.

Certain oriented board products can be made from flakes that are created from debarked round logs by placing the edge of a cutting knife parallel to a length of the log and the slicing thin flakes from the log. The cut flakes are subjected to forces that break the flakes into strands having a length parallel to the grain of the wood several times the width of the strand. The strands can be oriented on the board-forming machine with the strands predominantly oriented in a single (e.g., cross-machine) direction in one (e.g., core) layer and predominantly oriented in the generally perpendicular (machine) direction in adjacent layers. The various layers are bonded together by natural or synthetic resins under heat and pressure to make the finished product. Oriented, multilayer wood strand boards of the above described type are produced with bending, tensile strengths and face strengths comparable to those of commercial softwood plywood.

Two commonly used adhesives in the manufacturing of OSB and other engineered wood products are polymeric diphenylmethane diisocyanate (pMDI or MDI) and phenol formaldehyde (PF) resins. In general, pMDI performs better than PF as a wood adhesive, particularly when exposed to moisture. However, pMDI has a higher unit price and often is in limited supply due to its wide applications in other industries (e.g., foam industry). Further details of these and other wood adhesives are discussed more fully in Wang et al, U.S. Pat. No. 10,100,232 (issued Oct. 16, 2018), which is incorporated herein in its entirety by specific reference for all purposes.

DETAILED DESCRIPTION OF EXEMPLARY EMBODIMENTS

In various exemplary embodiments, the present invention comprises a method or process for a wood adhesive system comprising polymeric diphenylmethane diisocyanate (pMDI), and a functionalized oil. The wood adhesive system may be used in the manufacturing of engineered wood products (such as OSB, LSL, LVL, or plywood) which typically are produced by various primary (and sometimes secondary) pressing processes.

The present invention provides an adhesive with reduced usage of pMDI while maintaining its performance as a wood adhesive. More specifically, the present invention comprises of mixture of pMDI and a vegetable oil mixture containing or partially containing a functionalized oil, which reduces the use of pMDI while maintaining adhesive performance. A functionalized oil is one modified through chemical reactions to incorporate function groups into polymer backbones, as described below.

Vegetable oils are obtained from a plant source, such as vegetables, nuts, or seeds. Besides being edible, they are now increasingly being used in industrial applications such as paints, lubricants, soaps, biofuels etc. Vegetable oils are triacylglycerols of fatty acids. They contain suitable functionalities in their backbone such as double bonds, epoxies, hydroxyls, esters and other functional groups that can undergo several chemical reactions. Vegetable oils, such as soy oil, may also be modified through chemical reactions to incorporate function groups (e.g., hydroxyl, epoxy, amine, etc.) into polymer backbones.

Further, drying is an inherent characteristic of vegetable oil. Drying or semi-drying vegetable oil (e.g., linseed oil) are used in surface coatings. U.S. Pat. No. 5,942,058 (which is incorporated herein in its entirety by specific reference for all purposes) discloses an adhesive system comprising a resin and a conjugated drying oil for producing wood composite products. The drying oil acts an internal release agent to prevent the composites panels from sticking to the platens.

Figure 1:
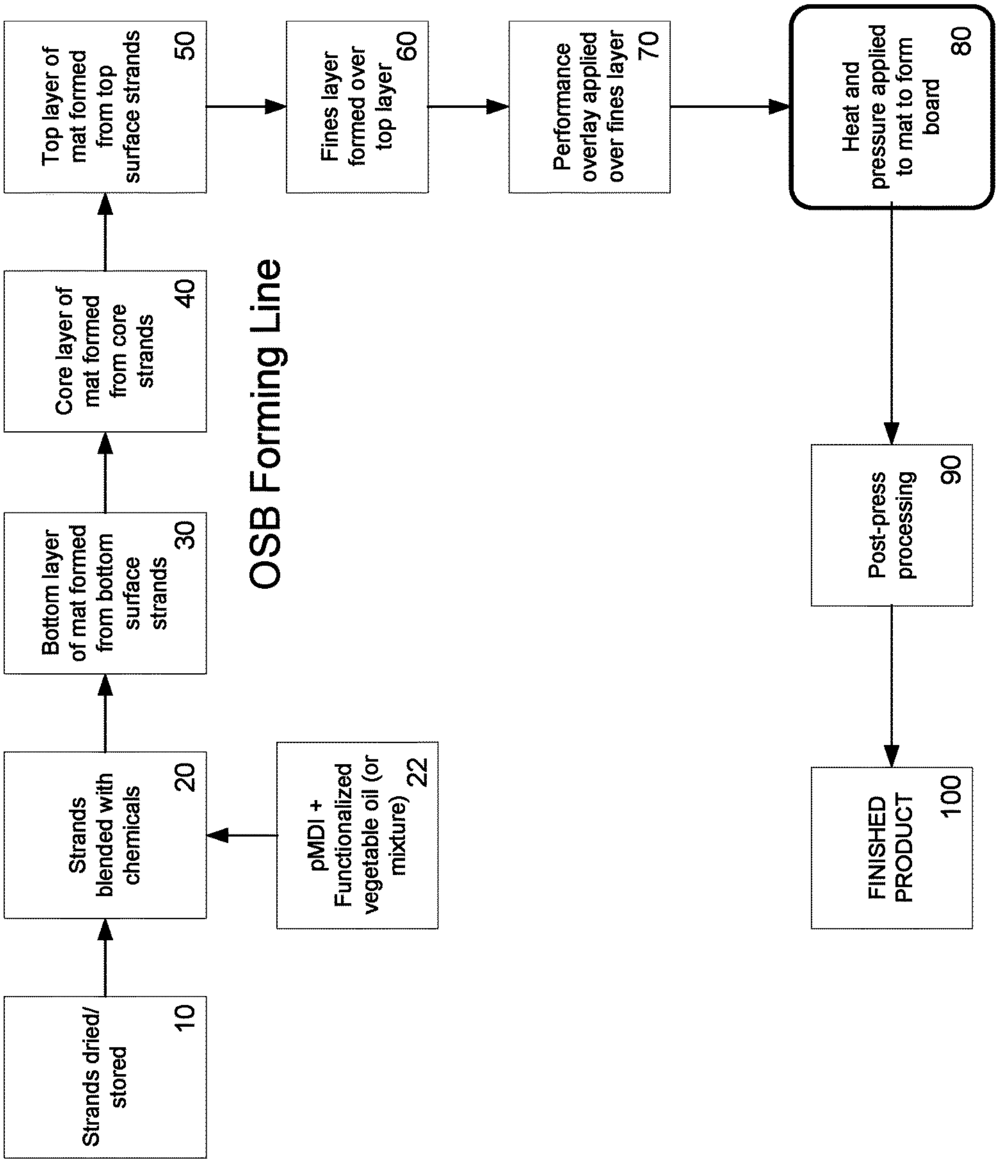
FIG. 1 shows a diagram of a process in accordance with an exemplary embodiment of the present invention.
Figure 2:
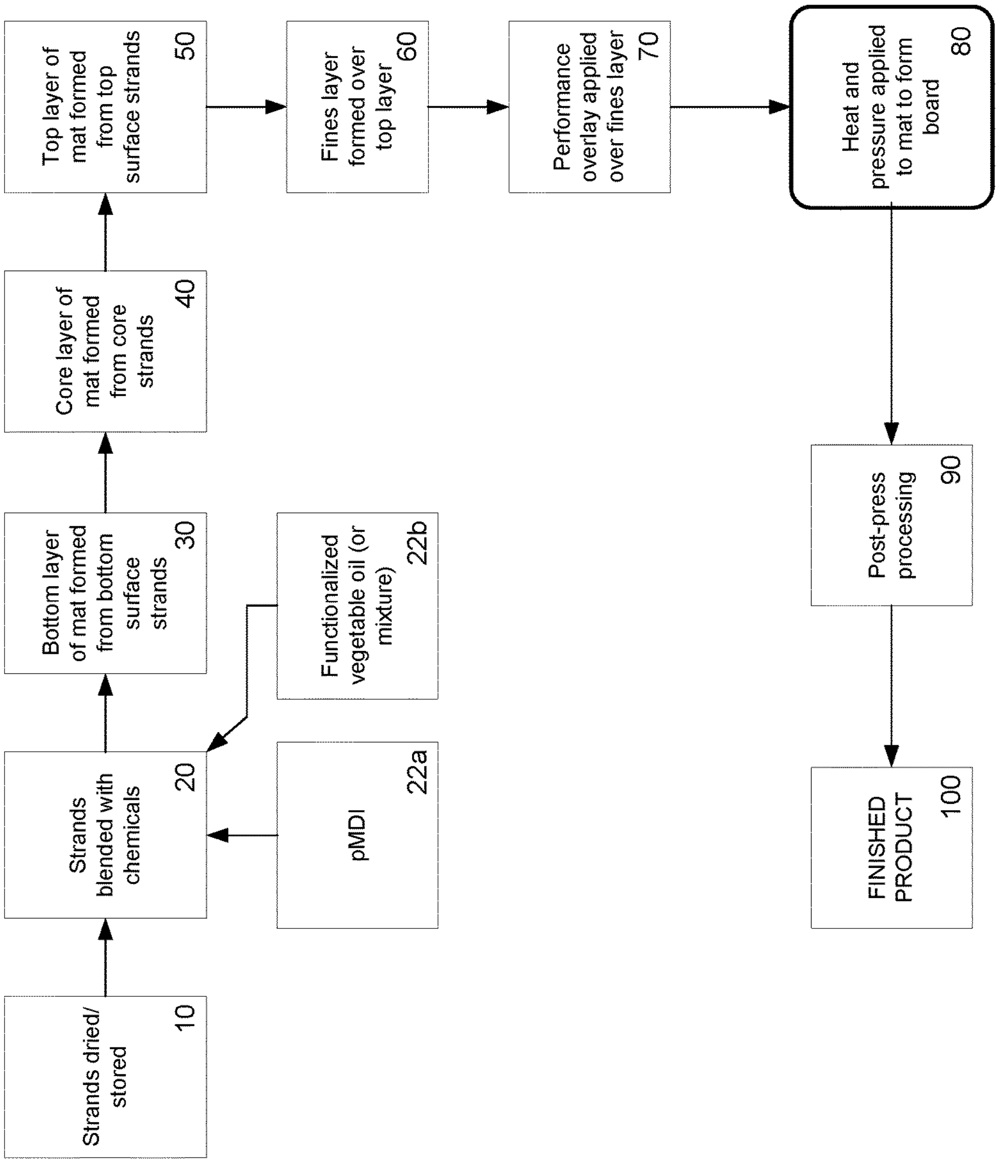
FIG. 2 shows a diagram of an alternative process in accordance with another exemplary embodiment of the present invention.
Figure 3:
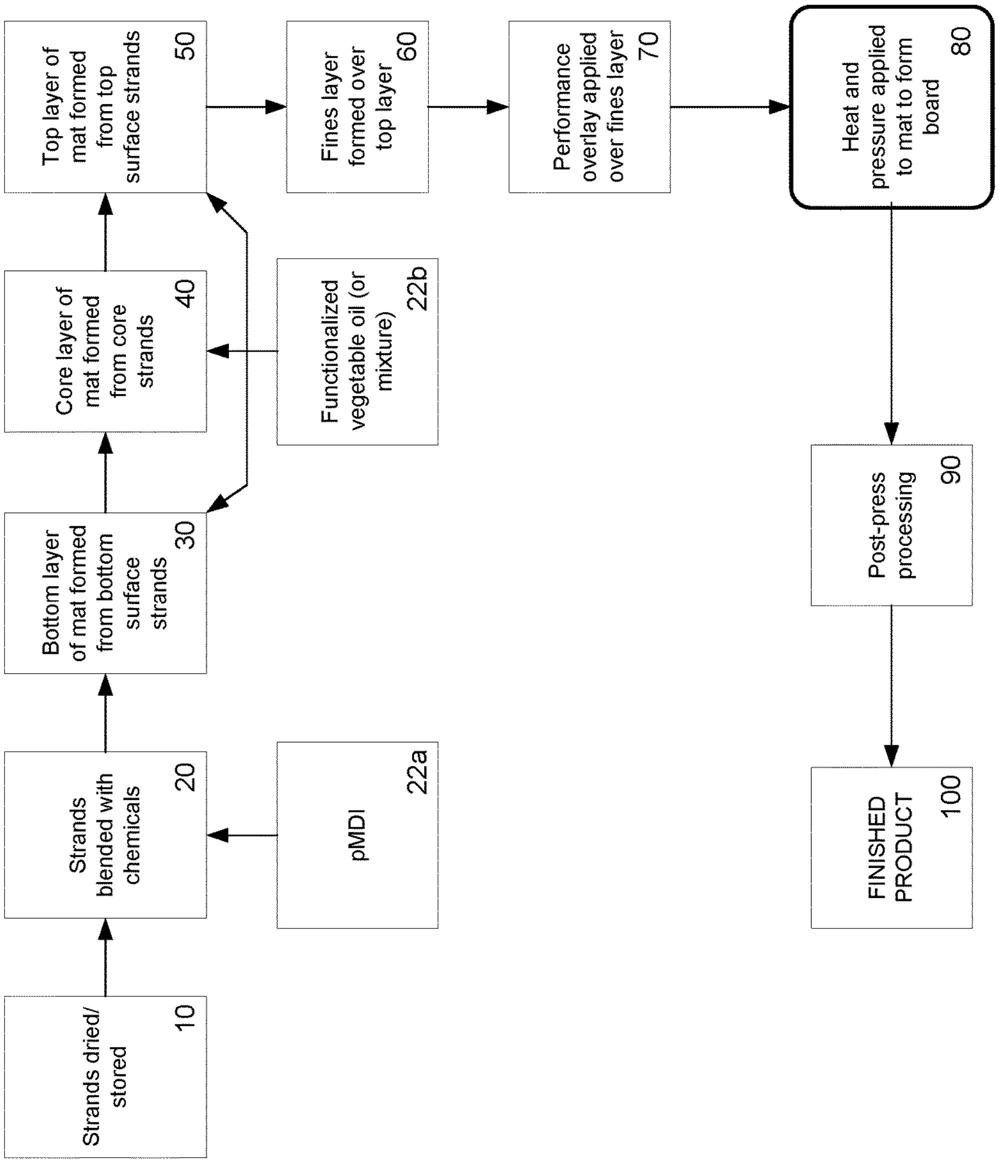
FIG. 3 shows a diagram of an alternative process in accordance with another exemplary embodiment of the present invention.

General elements of the OSB manufacturing process in accordance with the present invention, as seen in FIG. 1, include the drying and storing of wood strands 10, the treatment or blending of designated strands (e.g., bottom, core, top) with applicable chemicals and/or additives (e.g., wax, resin, and the like) 20, including the addition of pMDI adhesive pre-mixed with functionalized oil(s) 22 (as described herein), the forming of the appropriate layers in order (first bottom surface, then core, then top surface) using designated strands 30, 40, 50, the optional application of a fines layer over the top layer 60, the optional application of a performance overlay, such as a paper overlay or a resin-impregnated paper overlay 70, over the top layer or the optional fines layer, the application of heat and pressure to the mats using a primary press to form boards 80, and subsequent trimming and processing (e.g., panels cut to size, edges primed/sealed, and packaging) 90 to produce the finished product 100. Strands for a particular layer typically are blended with applicable chemicals and/or additives in a bin, separate from strands for other layers, although this is not always the case. As seen in FIGS. 2 and 3, as alternatives to pre-mixing the functionalized oil(s) with the pMDI before blending, as seen in FIG. 1, the functionalized oil(s) may be separately applied to the wood strands or mats, either by the functionalized oil(s) 22*b* being added to the blender separately from the pMDI 22*a* (see FIG. 2), or by the functionalized oil(s) being separately added to one or more of the wood strand mat layers, or the surfaces thereof (see FIG. 3).

Specific, non-limiting, examples, include the following:

Example 1: Soy oil is chemically modified to incorporate hydroxyl groups to its molecular chains. This soy oil-based polyol is then co-applied with polymeric MDI (pMDI) as a wood adhesive. The polyol may be premixed with pMDI or applied separately from the pMDI to the wood and/or wood surface(s). The ratio between the soy oil-based polyol to pMDI ranges from 5:95 (i.e., 5% soy-oil based polyol, 95% pMDI) to 40:60 (i.e., 40% soy-oil based polyol, 60% pMDI), preferably a ratio from 10:90 to 20:80. (Ratios herein expressed as x:y may also be expressed as percentages, as indicated above.)

Example 2: The above-mentioned soy oil-based polyol (of Example 1) is first mixed with a soy oil, prior to application with the pMDI, at a ratio of soy-based polyol to soy oil at 5:95. This soy-based polyol/soy oil mixture is then co-applied with pMDI as a wood adhesive. The soy-based polyol/soy oil mixture may be premixed with pMDI or applied separately from the pMDI to the wood and/or wood surface(s), as described above. The ratio between the soy-based polyol/soy oil mixture to pMDI ranges from 5:95 to 40:60, preferably 10:90 to 20:80.

Example 3: Soy oil is chemically modified to incorporate amine groups to its molecular chains. This amine-functionalized soy oil is then co-applied with pMDI as a wood adhesive. The amine-functionalized soy oil may be pre-mixed with pMDI or applied separately to the wood and/or wood surface(s), as described above. The ratio between the amine-functionalized soy oil to pMDI ranges from 5:95 to 40:60, preferably 10:90 to 20:80.

Example 4: The above-mentioned amine-functionalized soy oil (of Example 3) is first mixed with a soy oil, prior to application with the pMDI, at a ratio of the amine-functionalized soy oil to soy oil of 5:95. This mixture is then co-applied with pMDI as a wood adhesive. The amine-functionalized soy oil/soy oil mixture may be premixed with pMDI or applied separately to the wood and/or wood surface(s), as described above. The ratio between the amine-functionalized soy oil/soy oil mixture to pMDI ranges from 5:95 to 40:60, preferably 10:90 to 20:80.

Example 5: The above-mentioned soy oil-based polyol (from Examples 1 and 2) and amine-functionalized soy oil (from Examples 3 and 4) are both mixed together with a soy oil as a third component. Each component in the mixture may range from 1% to 95% in the combined soy oil mixture, with the total percentage of all 3 components totaling 100%. This three-component soy oil mixture is then co-applied with pMDI as a wood adhesive. The three-component soy oil mixture may be premixed with pMDI or applied separately to wood and/or wood surface(s), as described above. The ratio between the three-component soy mixture to pMDI ranges from 5:95 to 40:60, preferably 10:90 to 20:80.

Accordingly, a method of producing engineered wood, in accordance with an embodiment of the present invention, comprises the steps of:

providing a plurality of lignocellulosic strands or fibers;

treating the plurality of wood strands with a binder comprising polymeric diphenylmethane diisocyanate (pMDI), and a functionalized oil;

forming a multi-layer mat from the plurality of treated wood strands; and applying heat and pressure to the multi-layer mat to produce a manufactured wood product. The mat may comprise three or more layers. The manufactured wood product may be oriented-strand board. The product also may be a structural panel or board, or a siding or cladding panel or board. The binder may further comprise a non-functionalized oil, as described above. The pMDI and functionalized oil may be pre-mixed together prior to treating the plurality of wood strands (i.e., prior to introduction of the pMDI and functionalized oil mixture into the blender), or alternatively, they may be added separately to the blender.

The functionalized oil may be a combined functionalized oil, combined different types of functionalized oils. For example, a combined functionalized oil may comprise a combination or mixture of soy oil modified to incorporate hydroxyl groups, and soy oil modified to incorporate amine groups. A nonfunctionalized oil may be mixed with the functionalized oil (single type or combined), or added independently to the blender. The nonfunctionalized oil may be pre-mixed first with the functionalized oil(s) (single type or combined), and then this oil mixture may be pre-mixed with the pMDI before being introduced to the blender, or the oil mixture may be added separately to the blender, as discussed above.

The invention further comprises the binder or adhesive for the production of composite products, the binder of adhesive comprising polymeric diphenylmethane diisocyanate (pMDI), and a functionalized vegetable oil, wherein the adhesive is configured to be mixed with lignocellulosic strands, fibers, and/or materials to bind said strands upon application of heat and pressure to form composite wood products. Examples of functionalized vegetable oil are provided above. Thus, for example, the functionalized vegetable oil may be a functionalized soy oil, comprising soy oil modified to incorporate hydroxyl groups, incorporate amine groups, or both. The binder or adhesive also may comprise a non-functionalized vegetable oil (e.g., non-functionalized soy oil).

The invention further comprises an engineered wood product, comprising the above binder or adhesive, and a plurality of lignocellulosic strands, fibers or material forming a composite product. The invention also comprises an engineered wood product produced by the method described above, comprising the above binder or adhesive with a functionalized oil While this disclosure has discussed the invention in the context of using pMDI with the functionalized oil, a personal of skill in the art will comprehend that other forms of adhesive used in the composite wood industry may be used in this invention, such as phenol formaldehyde (PF) resins. Other suitable adhesives or resins include, but are not limited to, amino-based resins (UF), melamine formaldehyde (MF), melamine-urea-formaldehyde (MUF), phenol-urea-formaldehyde (PUF), melamine-urea-phenolformaldehyde (MUPF), phenol-melamine-urea-formaldehyde (PMUF), liquid phenolic resins, powdered phenolic resins, protein adhesive, natural phenolic adhesives, epoxy resin, unsaturated polyester, as well as combinations thereof (along with PF and pMDI), such as a hybrid resin (including, but not limited to, pMDFUF or pMDI/PF).

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A method of producing engineered wood, comprising the steps of:
- providing a plurality of lignocellulosic strands or fibers;
- treating the plurality of lignocellulosic strands or fibers with a binder comprising polymeric diphenylmethane diisocyanate (pMDI), and a functionalized oil;
- forming a multi-layer mat from the plurality of treated wood strands; and
- applying heat and pressure to the multi-layer mat to produce a manufactured wood product;
- wherein the functionalized oil is functionalized soy oil, and the functionalized soy oil is soy oil modified to incorporate amine groups.

2. The method of claim 1, wherein the manufactured wood product is oriented-strand board.

3. The method of claim 1, wherein the manufactured wood product is a structural panel or board, or a siding or cladding panel or board.

4. The method of claim 1, wherein the multi-layer mat comprises at least three layers.

5. The method of claim 1, wherein the binder further comprises a non-functionalized oil.

6. The method of claim 1, wherein the pMDI and functionalized oil are pre-mixed together prior to treating the plurality of wood strands.

7. The method of claim 1, wherein step of treating the plurality of wood strands comprises the step of mixing the plurality of wood strands in a blender, further wherein the pMDI and functionalized oil are independently added to a blender.

8. The method of claim 1, wherein the ratio of the functionalized oil to the polymeric diphenylmethane diisocyanate (pMDI) ranges from 10:90 to 20:80.

9. The method of claim 1, wherein the ratio of the functionalized oil to the polymeric diphenylmethane diisocyanate (pMDI) ranges from 5:95 to 40:60.

10. The method of claim 1, comprising the step of mixing the functionalized oil with a nonfunctionalized oil prior to the step of treating the plurality of wood strands.

11. A method of producing engineered wood, comprising the steps of:
- providing a plurality of lignocellulosic strands or fibers;
- treating the plurality of lignocellulosic strands or fibers with a binder comprising polymeric diphenylmethane diisocyanate (pMDI), and a functionalized oil;
- forming a multi-layer mat from the plurality of treated wood strands; and
- applying heat and pressure to the multi-layer mat to produce a manufactured wood product;
- wherein the functionalized oil is a combined functionalized soy oil comprising a combination or mixture of soy oil modified to incorporate hydroxyl groups, and soy oil modified to incorporate amine groups.

12. The method of claim 11, further comprising the step of mixing a nonfunctionalized soy oil with the functionalized soy oil.

13. The method of claim 11, wherein the manufactured wood product is oriented-strand board.

14. The method of claim 11, wherein the manufactured wood product is a structural panel or board, or a siding or cladding panel or board.

15. The method of claim 11, wherein the multi-layer mat comprises at least three layers.

16. The method of claim 11, wherein the pMDI and functionalized oil are pre-mixed together prior to treating the plurality of wood strands.

17. The method of claim 11, wherein step of treating the plurality of wood strands comprises the step of mixing the plurality of wood strands in a blender, further wherein the pMDI and functionalized oil are independently added to a blender.

18. The method of claim 11, wherein the ratio of the functionalized oil to the polymeric diphenylmethane diisocyanate (pMDI) ranges from 10:90 to 20:80.

* * * * *